United States Patent [19]

Hegemier et al.

[11] Patent Number: 5,273,134
[45] Date of Patent: Dec. 28, 1993

[54] OIL CONSUMPTION MEASUREMENT SYSTEM FOR INTERNAL COMBUSTION ENGINE

[75] Inventors: Timothy A. Hegemier, Eaton, Ohio; Edward E. Lafever; John G. Spoonamore, both of Hagarstown, Ind.

[73] Assignee: Dana Corporation, Toledo, Ohio

[21] Appl. No.: 965,626

[22] Filed: Oct. 22, 1992

Related U.S. Application Data

[63] Continuation of Ser. No. 640,232, Jan. 11, 1991, abandoned.

[51] Int. Cl.[5] .......................................... F01M 11/06
[52] U.S. Cl. ................................. 184/6.4; 184/103.2; 184/108; 73/308; 73/319; 73/322.5; 123/196 S
[58] Field of Search ..................... 340/618, 623, 624; 73/305, 308, 309, 319, 322.5, 113; 123/196 S; 184/6.4, 103.1, 103.2, 108; 116/110; 200/84 R

[56] References Cited

U.S. PATENT DOCUMENTS

| | | | |
|---|---|---|---|
| 548,240 | 10/1895 | Williams | 73/322.5 |
| 1,498,617 | 6/1924 | Fredberg | 184/103.2 |
| 1,619,356 | 3/1927 | Martin | 200/84 R |
| 1,695,846 | 12/1928 | Harding | 200/84 R |
| 2,120,048 | 6/1938 | Turner | 137/68 |
| 2,576,561 | 11/1951 | Binford | 73/309 |
| 2,687,142 | 8/1954 | Law | 73/322.5 |
| 2,939,125 | 5/1960 | Swanson | 340/623 |
| 3,229,712 | 1/1966 | Perkins | 340/624 |
| 3,335,736 | 8/1967 | Liebel et al. | 137/39 |
| 3,473,372 | 10/1969 | Klink | 73/118 |
| 3,570,629 | 3/1971 | Wolfram Dahm et al. | 184/103 |
| 3,798,595 | 3/1974 | Dyke | 340/624 |
| 3,908,450 | 9/1975 | Schreiber | 73/113 |
| 3,931,485 | 1/1976 | Spielfiedel et al. | 73/308 |
| 4,134,301 | 1/1979 | Erwin, Jr. | 73/113 |
| 4,275,382 | 6/1981 | Jannotta | 137/386 |
| 4,398,186 | 8/1983 | Statz | 73/308 |
| 4,491,103 | 1/1985 | Deadman | 123/196 S |
| 4,497,205 | 2/1985 | Zulauf et al. | 73/319 |
| 4,500,761 | 2/1985 | Kubota et al. | 200/84.R |
| 4,554,494 | 11/1985 | Howeth | 340/623 |
| 4,771,804 | 9/1988 | Morales | 137/412 |
| 4,852,404 | 8/1989 | Catanese | 340/624 |
| 4,869,346 | 9/1989 | Nelson | 184/1.5 |

FOREIGN PATENT DOCUMENTS

| | | | |
|---|---|---|---|
| 0505784 | 9/1951 | Belgium | 340/624 |
| 0004232 | of 1887 | United Kingdom | 116/110 |
| 0905226 | 9/1967 | United Kingdom | 73/305 |

Primary Examiner—Richard R. Cole
Assistant Examiner—Alan B. Cariaso
Attorney, Agent, or Firm—MacMillan, Sobanski & Todd

[57] ABSTRACT

A system for precisely measuring the amount of oil consumed during operation of an internal combustion engine includes a float chamber which communicates with an oil sump in the engine. A float is disposed within the chamber which moves upwardly and downwardly therein, depending upon the level of oil. A precision level detector is mounted in the upper end of the chamber for generating an electrical signal which is representative of the position of the float within the chamber. A microprocessor receives this signal, along with signals from various other sensors representing engine speed, engine torque, and oil temperature. In response thereto, the microprocessor controls the operation of a pump connected between an external supply of oil and the engine sump. When predetermined conditions are met, the microprocessor activates the pump to add oil from the system. The microprocessor also records the oil level over a period of time to determine the rate of oil consumption.

20 Claims, 3 Drawing Sheets

OIL CONSUMPTION MEASUREMENT SYSTEM FOR INTERNAL COMBUSTION ENGINE

CROSS REFERENCE TO RELATED APPLICATION

This application is a continuation of Ser. No. 07/640,232, filed Jan. 11, 1991, now abandoned.

BACKGROUND OF THE INVENTION

This invention relates in general to measuring devices and in particular to a system for precisely measuring the amount of oil consumed during the operation of an internal combustion engine and for automatically replenishing such consumed oil.

Many mechanical devices are provided with lubrication systems for supplying oil or similar lubricants to the moving components thereof for reducing friction therebetween. For example, most internal combustion engines include an oil circulation system for distributing oil to various components of the reciprocating pistons and valves. Because of leakage and other factors, a certain amount of such oil or lubricant is consumed during use, thus reducing the overall volume thereof. As is well known, if the volume of oil or lubricant drops below a predetermined amount, damage can occur from excessive friction between the moving components of the mechanical device. To avoid this, a number of systems are known for automatically monitoring the level of oil in a mechanical device and for replenishing any oil which is consumed during use.

In certain situations, however, it may be desirable to measure the amount of oil which is consumed during use of a mechanical device in a very precise fashion. For example, test facilities are known for operating internal combustion engines under closely controlled conditions and for making precise measurements of various parameters. In such a test, an engine may be operated at a predetermined speed and torque level over a relatively short period of time. The various measurements which are taken during such testing can be used to predict the suitability of the engine and its various components for use under extended normal operating conditions. Since oil consumption is an important aspect to the operation of engines of this type and many other mechanical devices, it would be desirable to provide a system for precisely measuring the amount of oil which is consumed during testing.

SUMMARY OF THE INVENTION

This invention relates to a system for precisely measuring the amount of oil consumed during operation of an internal combustion engine or a similar device. The system includes a float chamber which communicates with an oil sump in the engine. Thus, the level of oil within the chamber is representative of the level of oil in the engine sump and, therefore, the overall volume of oil within the engine. A float is disposed within the chamber which moves upwardly and downwardly therein, depending upon the level of oil. A precision level detector is mounted in the upper end of the chamber for generating an electrical signal which is representative of the position of the float within the chamber. A microprocessor receives this signal, along with signals from various other sensors representing engine speed, engine torque, and oil temperature. In response thereto, the microprocessor controls the operation of a pump connected between an external supply of oil and the engine sump. When predetermined conditions are met, the microprocessor activates the pump to add oil from the reservoir. The microprocessor also records the oil level over a period of time to determine the rate of oil consumption.

It is an object of this invention to provide a system for precisely measuring the amount of oil consumed during operation of an internal combustion engine or a similar device.

It is another object of this invention to provide such a system which automatically replenishes any consumed oil so as to maintain a constant amount of oil in the engine or similar device.

It is a further object of this invention to provide such a system which stores the oil consumption measurements made over a period of time and generates a value for the rate of oil consumption.

Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
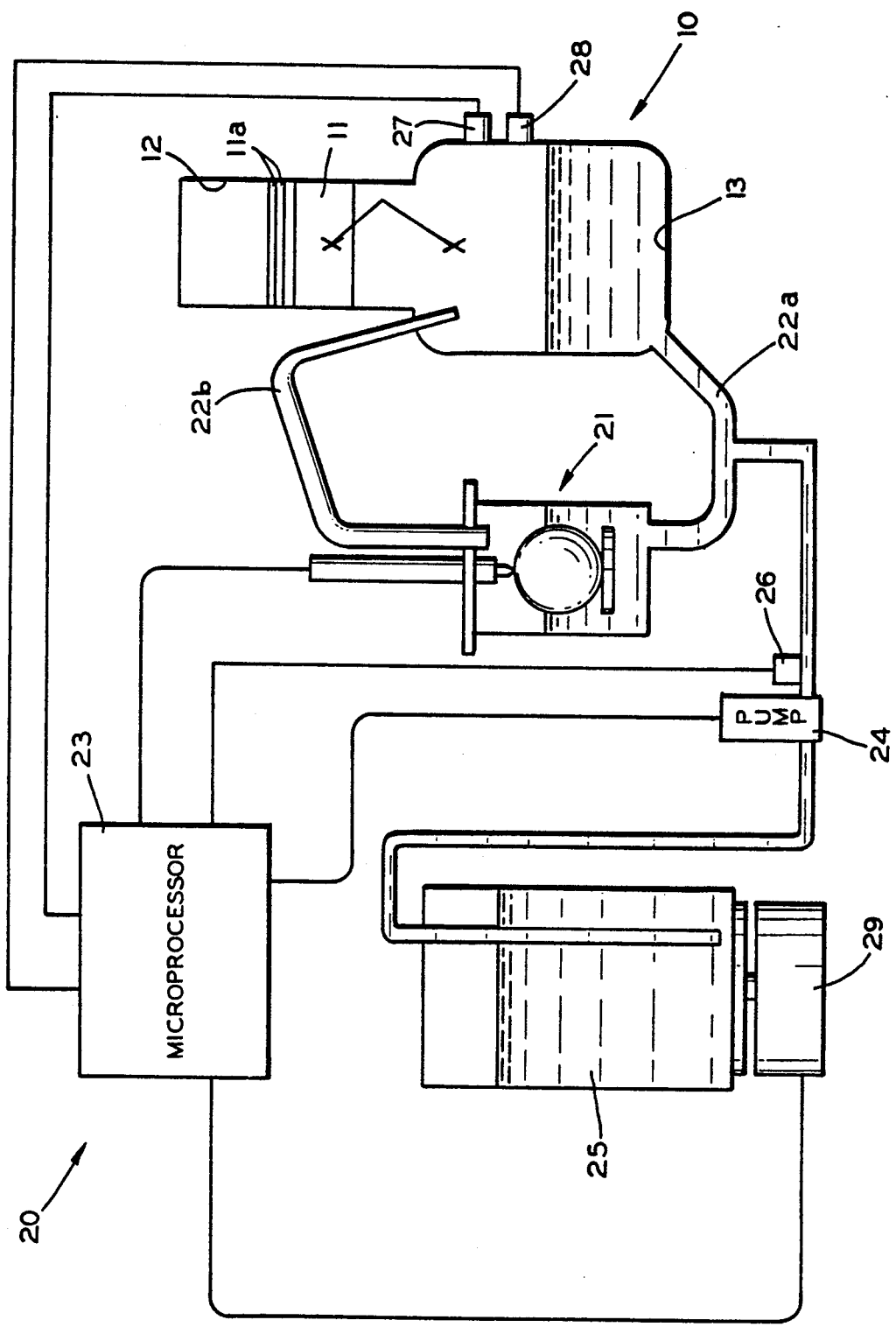
FIG. 1 is a schematic diagram of a system for precisely measuring the amount of oil consumed during operation of an internal combustion engine in accordance with this invention.

Referring now to the drawings, there is illustrated in FIG. 1 an internal combustion engine, indicated generally at 10. The engine 10 is conventional in the art and includes plurality of pistons 11 (only one is illustrated) which are disposed within respective cylinders 12 for reciprocating movement. A plurality of piston rings 11a are mounted on the piston 11 to sealingly engage the inner surface of the cylinder 12 to prevent leakage between the upper and lower ends of the piston 11. The engine 10 further includes a sump 13 for holding a quantity of oil for lubricating the various moving components of the engine 10 during use. Although this invention will be described and illustrated as being used in conjunction with the internal combustion engine 10, it will be appreciated that the invention may be used with other similar devices.

The engine 10 is provided with a conventional oil circulation system (not shown) for distributing oil to the various moving components thereof. Initially, a predetermined volume of oil is provided within the engine 10 for this purpose. However, when the engine 10 is operated, a certain amount of the oil is consumed, primarily as a result of leakage. One point of oil leakage occurs between the piston rings 11a and the inner surface of the cylinder 12, wherein oil is drawn upwardly into the combustion chamber of the cylinder 12. Another point of leakage is around the valve stems (not shown) of the cylinder 12. In either event, the leakage causes the volume of oil contained within the engine 10 to be decreased.

In order to precisely monitor this oil consumption, an oil measuring system, indicated generally at 20, is provided. The system 20 includes a float chamber assembly, indicated generally at 21, which is supported adjacent to the engine 10. The structure and operation of the float chamber assembly 21 will be described in detail below. A first passageway 22a provides fluid communication between the lower end of the engine sump 13 and the lower end of the float chamber assembly 21. Similarly, a second passageway 22b provides fluid communication between the upper end of the engine sump 13 and the upper end of the float chamber assembly 21. As a result, the level of oil in the float chamber assembly 21 is equal to the level of oil in the engine sump 13. As will be explained in detail below, means are provided for precisely measuring the level of the oil in the float chamber assembly 21 and for generating an electrical signal which is representative thereof.

The oil level electrical signal is fed to a conventional microprocessor 23 or similar general purpose computer. As will be explained in detail below, the microprocessor 23 compares the actual level of oil in the float chamber assembly 21 with a predetermined value. In response to this comparison, the microprocessor 23 controls the operation of a pump 24 connected between an external oil reservoir 25 and the engine sump 13. When the actual oil level is less than the predetermined level, the microprocessor 23 actuates the pump 24 to inject a certain volume of oil from the reservoir 25 through the first passageway 22a and into the engine sump 13.

A temperature sensor 26 is mounted in the first passageway 22a extending between the engine sump 13 and the float chamber assembly 21. The sensor 26 generates an electrical signal which is representative of the temperature of the oil to the microprocessor 23. An engine speed sensor 27 and an engine torque sensor 28 are mounted on the engine 10. The sensors 27 and 28 generate respective electrical signals which are representative of the speed of the engine 10 and torque load placed thereon. Lastly, a load sensor 29 is provided on the reservoir 25 for generating a signal which is representative of the weight of the oil contained therein. As will also be explained in detail below, the microprocessor 23 is responsive to the signals from each of the sensors 26, 27, 28, and 29 for controlling the operation of the system 20. Other sensors may also be provided for generating signals representing other parameters of interest.

Because it is desirable that the amount of oil which is added to the engine sump 13 be precisely controlled and measured, the pump 24 is preferably only intermittently actuated by the microprocessor 23. Furthermore, it is desirable that each actuation of the pump 24 cause a precisely measured amount of oil to be injected into the engine sump 13. Pumps of this general type are, commercially available. For example, a Model PiP1CKC pump available from Fluid Metering, Inc. of Oyster Bay, N.Y. has been found to function satisfactorily. The volume of oil which is injected upon each actuation of the pump 24 can be adjusted depending upon the particular engine 10 being tested and upon the degree of accuracy required in the test.

Figure 2:
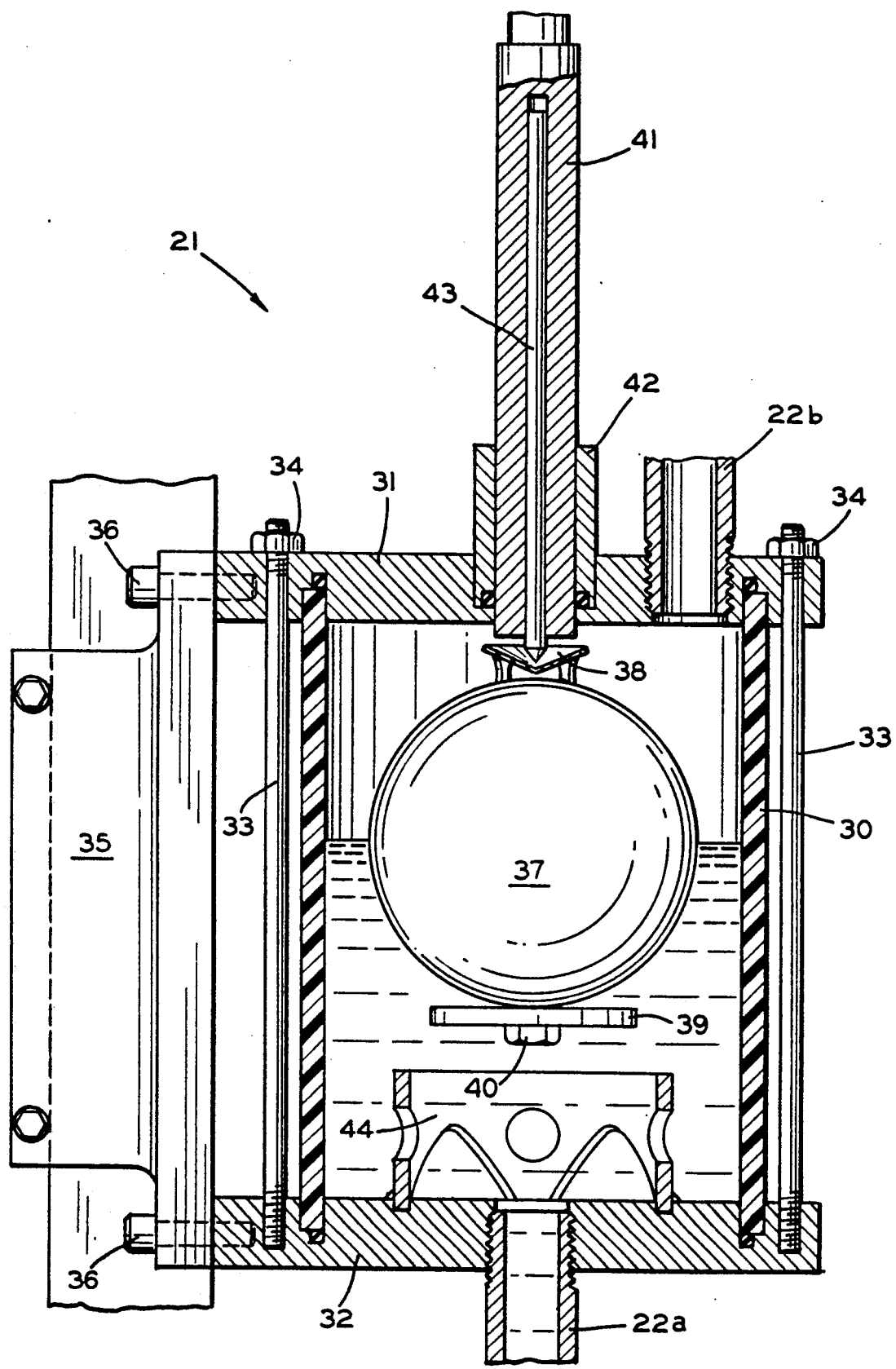
FIG. 2 is an elevational view, partially in section, of the float chamber assembly illustrated in FIG. 1.

Referring now to FIG. 2, the structure of the float chamber assembly 21 is illustrated in detail. As shown therein, the assembly 21 is formed by a hollow cylindrical tube 30, the ends of which are closed by upper and lower end plates 31 and 32, respectively. The ends of the tube 30 extend into circular recesses formed in the end plates 31 and 32, and respective 0-rings or similar seals are provided therein to prevent leakage. The tube 30 is preferably formed from an acrylic material, while the end plates 31 and 32 may be formed from aluminum.

The tube 30 and the end plates 31 and 32 are held together by a plurality of threaded studs 33. The studs 33 may be threaded into respective threaded bores formed in the lower end plate 32 and extend through non-threaded apertures formed through the upper end plate 31. Nuts 34 are threaded onto the upper ends of the studs which, when tightened, draw the end plates 31 and 32 together to compress the tube 30 therebetween. The entire assembly 21 may be mounted on a rigid support or bracket 35 by threaded fasteners 36 extending therethrough into the end plates 31 and 32.

A float 37 is disposed within the tube 30 between the end plates 31 and 32. The float 37 is hollow and spherical in shape, preferably formed from stainless steel. A guide 38 is secured to the surface of the float 37 by welding or similar means. The guide 38 has a conical recess formed therein for a purpose which will be described below. A counterweight 39 is secured to the float 37 by a threaded fastener 40 or similar means at a location which is diametrically opposed to the location of the guide 38. The counterweight 39 is sized to be somewhat heavier than the guide 38. Thus, as the float 37 floats on the oil contained within the assembly 21, the counterweight 39 maintains the guide 38 facing upwardly toward the upper end plate 31, as illustrated in FIG. 2.

A precision position sensor 41 is mounted in an aperture formed through the upper end plate 31 by means of a locking collar 42. An O-ring or similar means is provided for preventing leakage through the aperture. The position sensor 41 is adapted to generate an electrical signal to the microprocessor 23 which is representative of the relative position of the float 37 within the assembly 21. To accomplish this, the sensor 41 is provided with a movable plunger 43 which extends downwardly into engagement with the guide 38 secured to the float 37. Thus, as the float 37 moves upwardly and downwardly within the assembly 21 with the level of the oil, the plunger 43 moves upwardly and downwardly therewith. The sensor 41 is responsive to the relative position of the plunger 43 for generating the electrical signal to the microprocessor 23. The sensor 41 can be a linear variable displacement transducer, such as a Model 500 HCD transducer available from Schaevitz Engineering, Inc. of Hoboken, N.J.

A cage 44 is secured to the lower end plate 32 by welding or similar means. The cage 44 is generally hollow and cylindrical in shape, having a plurality of apertures and similar openings formed therethrough to permit the free passage of oil from the first passageway 22a into the assembly 21. The cage 44 is provided to support the float 37 when there is no oil contained within the assembly 21 (such as during shipment or prior to use) or when the level of the oil contained within the assembly 21 is very low. By supporting the float 37 in this manner, the cage 44 prevents the float 37 from becoming mis-oriented within the assembly 21, as might occur if the threaded fastener abutted the lower end plate 32. Also, the cage 44 prevents the float 37 from plugging the aperture through which the first passageway 22a communicates.

Figure 3:
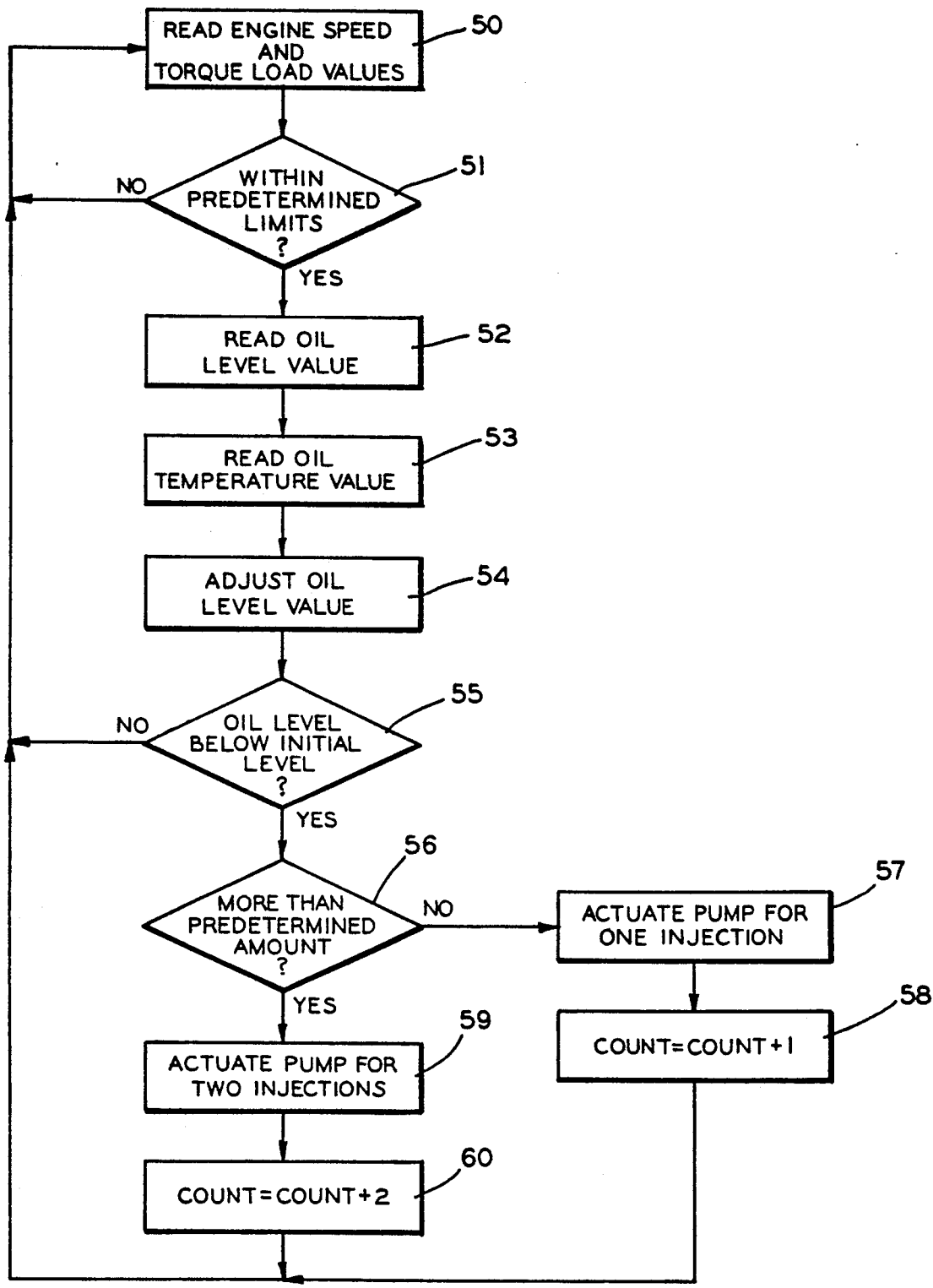
FIG. 3 is a flow chart of a program executed by the microprocessor illustrated in FIG. 1.

Referring now to FIG. 3, there is illustrated a flow chart of the program executed by the microprocessor 23 to monitor the loss of oil in the engine 10 resulting from operation. The program initially enters an instruction 50, wherein the microprocessor 23 reads the values of engine speed and torque load supplied by the sensors 27 and 28. The program next enters a decision point 51, wherein it is determined whether the engine speed and torque load values are equal to predetermined limits stored in the memory of the microprocessor 23. As mentioned above, when testing the engine 10, it is desirable to closely control the operation thereof in accordance with these predetermined limits. The actual values of these limits may vary depending upon the particular engine being monitored. If the engine speed and torque load values are not equal to the predetermined limits, the program branches back to the instruction 50. Thus, the microprocessor 23 repeatedly reads the values of the sensors 27 and 28 until the engine 10 achieves the predetermined operating conditions.

When such operating conditions are met, the program branches from the decision point 51 to an instruction 52, wherein the microprocessor 23 reads the level of the oil in the float chamber assembly 21 as supplied by the position sensor 41. The program next enters an instruction 53, wherein the microprocessor 23 reads the value of the oil temperature as supplied by the temperature sensor 26. Then, the program enters an instruction 54, wherein the value of the oil level supplied by the position sensor 41 is adjusted to compensate for the temperature of the oil. As is well known, the volume of the oil expands slightly as the temperature thereof increases. The microprocessor 23 compensates for this variation by adjusting the actual position value sensed by the position sensor 41 in accordance with known data concerning temperature induced volumetric changes in the oil.

The program next enters a decision point 55, wherein it is determined whether the oil level is less than the initial level when the test of the engine 10 began. If the oil level has not dropped below this initial level, the program branches back to the instruction 50 to re-check the values of the engine speed and torque load. Thus, the microprocessor 23 repeatedly reads the value of the position sensor 41 until the oil level drops below the initial level. When this occurs, the program branches from the decision point 55 to a decision point 56, wherein it is determined whether the oil level has decreased by more than a predetermined amount. If not, the program branches to an instruction 57, wherein the microprocessor 23 generates a signal to actuate the pump 24 to make a single injection of a predetermined small amount of oil from the reservoir 25 into the engine sump 13. The program then enters an instruction 58 to increment the value of a variable named COUNT by one. Then, the program branches back to the instruction 50, wherein the entire process is repeated.

If, on the other hand, the oil level has decreased by more than the predetermined amount, the program branches from the decision point 56 to an instruction 59, wherein the microprocessor 23 generates a signal to actuate the pump 24 to make two injections of the predetermined small amount of oil from the reservoir 25 into the engine sump 13. The program then enters an instruction to increment the value of a variable named COUNT by two. Then, the program branches back to the instruction 50, wherein the entire process is repeated.

Thus, it can be seen that the microprocessor 23 continuously checks the operating conditions of the engine 10 to ensure that it is being operated in accordance with the desired predetermined conditions. Any conventional control system (not shown) may be used to operate the engine 10 under these conditions. So long as such conditions are satisfied, the microprocessor 23 repeatedly measures the amount of oil in the engine 10 by means of the position sensor 41 in the float chamber assembly 21. As oil is consumed, it is automatically replenished by the pump 24. Furthermore, the amount of such oil consumption can be determined by the value of the variable COUNT when the test is concluded. Because the pump 24 injects a precise volume of oil each time it is actuated by the microprocessor 23, and further because the value of the variable COUNT is equal to the number of such injections, the total volume of oil consumed is equal to the product of the volume of oil per injection times the number of such injections.

To verify the amount of oil consumed during a test, the volume calculated as described above can be compared with the volume as determined by the beginning and ending values of the signals generated by the load transducer 29. As mentioned above, the load transducer 29 is provided on the reservoir 25 for generating a signal which is representative of the weight of the oil contained therein. The difference between the beginning and ending values of the load transducer signals is equal to the weight of the oil consumed during the test (since the oil was pumped out of the reservoir 25 into the engine sump 13). By dividing this measured weight loss value by the known value of the weight per unit volume of the oil, the value of the volume of the consumed oil can be determined. This value can be compared with the volume value calculated as described above to verify the accuracy thereof. Finally, by dividing the volume of consumed oil by the elapsed time of the testing process, a value can be determined for the rate at which oil is consumed. This rate value can be used to predict the suitability of the engine and its various components for use under extended normal operating conditions.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A system for generating an indication of the level of a fluid in a chamber comprising:
   a float disposed in the chamber and adapted to float on the fluid such that the position of said float in the chamber is representative of the level of the fluid therein;
   means secured to said float defining an engagement surface;
   position sensing means including a plunger which is movable relative to said float and which is in abutment with said engagement surface of said float so as to be continuously movable therewith, said position sensing means being responsive to the relative position of said plunger for generating an indication of the level of the fluid in the chamber; and
   means secured to said float for maintaining said engagement surface of said float facing toward said plunger of said position sensing means under the influence of gravity.

2. The invention defined in claim 1 wherein said engagement surface includes a guide secured to said float for receiving said plunger.

3. The invention defined in claim 2 wherein said plunger has a conical tip and wherein said guide has a conical recess formed therein for receiving said plunger tip.

4. The invention defined in claim 1 wherein said means for maintaining said engagement surface facing toward said plunger includes a counterweight secured to said float.

5. The invention defined in claim 4 wherein said engagement surface includes a guide secured to said float for receiving said plunger.

6. The invention defined in claim 1 further including a support cage disposed within the chamber below said float, said support cage adapted to support said float when the level of fluid in the chamber falls below a predetermined level.

7. The invention defined in claim 6 wherein said support cage has a plurality of openings formed therein for allowing the fluid in the chamber to flow therethrough.

8. A system for generating an indication of the level of oil in an oil sump of an engine comprising:
a chamber;
means for providing fluid communication between said chamber and the oil sump such that the level of the oil in said chamber is representative of the level of the oil in the oil sump;
a float disposed in said chamber and adapted to float on the oil such that the position of said float in the chamber is representative of the level of the oil therein;
means secured to said float defining an engagement surface;
position sensing means including a plunger which is movable relative to said float and which is in abutment with said engagement surface of said float so as to be continuously movable therewith, said position sensing means being responsive to the relative position of said plunger for generating an indication of the level of the fluid in the chamber; and
means secured to said float for maintaining said engagement surface toward said plunger of said position sensing means under the influence of gravity.

9. The invention defined in claim 8 wherein said engagement surface includes a guide secured to said float for receiving said plunger.

10. The invention defined in claim 8 wherein said means for maintaining said engagement surface facing toward said plunger includes a counterweight secured to said float.

11. The invention defined in claim 10 wherein said engagement surface includes a guide secured to said float for receiving said plunger.

12. The invention defined in claim 8 further including a support cage disposed within the chamber below said float, said support cage adapted to support said float when the level of fluid in the chamber falls below a predetermined level.

13. The invention defined in claim 12 wherein said support cage has a plurality of openings formed therein for allowing the fluid in the chamber to the flow therethrough.

14. The invention defined in claim 8 wherein said position sensing means includes a sensor for generating an electrical signal which is representative of the level of the oil within said chamber and a microprocessor for receiving said sensor signal.

15. The invention defined in claim 14 further including a sensor for generating a signal which is representative of the temperature of the oil, said microprocessor adjusting the value of said oil level signal is response to said oil temperature signal.

16. The invention defined in claim 8 further including means for adding a predetermined amount of oil to the sump when the level of oil in the oil sump has decreased by a predetermined amount.

17. The invention defined in claim 16 wherein said means for adding a predetermined amount of oil includes a reservoir of oil and a pump connected between said said reservoir and the oil sump, said pump being actuated when the level of oil in the oil sump has decreased by a predetermined amount to add a predetermined amount of oil to the oil sump.

18. The invention defined in claim 17 wherein said means for adding a predetermined amount of oil further includes a microprocessor responsive to said position sensing means for selectively actuating said pump.

19. The invention defined in claim 18 further including a sensor for generating a signal which is representative of the temperature of the oil, said microprocessor adjusting the value of said oil level signal is response to said oil temperature signal.

20. The invention defined in claim 18 further including a sensor for generating a signal which is representative of the weight of the oil in said reservoir for selectively actuating said pump.

* * * * *